United States Patent
Klearman et al.

(10) Patent No.: US 7,343,006 B2
(45) Date of Patent: Mar. 11, 2008

(54) DRIVE-IN RESTAURANT CREDIT-CARD TRANSACTION SYSTEM

(75) Inventors: William I. Klearman, Edmond, OK (US); Michael Lee Williams, Guthrie, OK (US); Richard Ewald, Edmond, OK (US)

(73) Assignee: Americas's Drive-In Corp., Wichita, KS (US)

( * ) Notice: Subject to any disclaimer, the term of this patent is extended or adjusted under 35 U.S.C. 154(b) by 211 days.

(21) Appl. No.: 10/951,129

(22) Filed: Sep. 27, 2004

(65) Prior Publication Data

US 2005/0177433 A1 Aug. 11, 2005

Related U.S. Application Data

(60) Provisional application No. 60/505,959, filed on Sep. 25, 2003.

(51) Int. Cl.
*H04M 15/00* (2006.01)
(52) U.S. Cl. ............................. 379/114.19; 379/93.12; 455/414.1; 705/26
(58) Field of Classification Search .............. 705/18, 705/21, 26, 41, 39, 43, 40, 44; 379/93.01, 379/114.19, 93.12; 455/414.1
See application file for complete search history.

(56) References Cited

U.S. PATENT DOCUMENTS 4,073,368 A * 2/1978 Mustapick ............... 186/53

5,806,071 A * 9/1998 Balderrama et al. ..... 707/104.1
6,666,374 B1 12/2003 Green et al.
2003/0208409 A1* 11/2003 Mault ......................... 705/26

FOREIGN PATENT DOCUMENTS

WO WO96/04618 * 2/1996

OTHER PUBLICATIONS

VeriFone Timeline: 23 Years of Leadership in Global Payments; http://www.verifone.com/aboutus/timeline.html; Apr. 14, 2006; 5 pages.*

* cited by examiner

*Primary Examiner*—Elaine Gort
(74) *Attorney, Agent, or Firm*—Crowe & Dunlevy, P.C.

(57) ABSTRACT

A method for conducting credit card transactions at a business having a plurality of remote customer interfaces includes the steps of electronically transmitting a customer's order from one of the plurality of remote customer interfaces to a transaction hub, entering the customer's order into the transaction hub, transmitting payment information for the customer's order from the transaction hub to a credit card interface at the one of the plurality of remote customer interfaces, electronically transmitting credit card information from the credit card interface to the transaction hub and conducting a credit card approval procedure. A presently preferred apparatus includes a system that includes a remote customer interface and a transaction hub. The remote customer interface preferably includes a credit card interface and a radio client. The transaction hub preferably includes a central server and a radio client.

13 Claims, 2 Drawing Sheets

DRIVE-IN RESTAURANT CREDIT-CARD TRANSACTION SYSTEM

RELATED APPLICATIONS

The present application claims benefit to U.S. Provisional Patent Application No. 60/505,959, filed Sep. 25, 2003, entitled Drive-In Restaurant Credit Card Transaction System, the disclosure of which is hereby incorporated by reference.

FIELD OF THE INVENTION

This invention relates generally to the field of credit card transaction systems, and more particularly, but not by limitation, to a novel credit card transaction system for a business having multiple remote customer interfaces.

BACKGROUND OF THE INVENTION

"Drive-in restaurants" are characterized by a method of selling food in which customers are permitted to order, receive and pay for food without leaving their vehicles. In many cases, a drive-in restaurant will have a number of "stalls" in which customers park their vehicles. Drive-in stalls may include a menu and a method of placing an order to the inside of the restaurant using an intercom or similar device. Once the food is prepared, an employee, often referred to as a "carhop," delivers the food to the customer at the stall. The carhop is often responsible for taking the customer's money, making change if necessary, and registering the money inside the restaurant.

In the past, drive-in restaurants were primarily cash-based operations and the success of drive-in restaurants was due largely to the convenience of allowing customers to complete the food-purchase transaction from their vehicles. As credit cards have become more popular, however, the convenience of completing the food-purchase transaction from the customer's vehicle has diminished.

Like dine-in restaurants, modern drive-in restaurants with credit-card capabilities include one or more credit-card processors housed inside the restaurant and customers using credit cards must therefore surrender their credit card to the carhop, wait for the carhop to process the credit card inside the restaurant and sign the credit card receipt upon approval of the credit card transaction. There is therefore a continued need to improve the efficiency and convenience of credit card transactions at drive-in restaurants.

SUMMARY OF THE INVENTION

A presently preferred embodiment of the invention includes a method and apparatus for conducting credit card transactions at a business having a plurality of remote customer interfaces. The preferred method includes the steps of electronically transmitting a customer's order from one of the plurality of remote customer interfaces to a transaction hub, entering the customer's order into the transaction hub, transmitting payment information for the customer's order from the transaction hub to a credit card interface at the one of the plurality of remote customer interfaces, electronically transmitting credit card information from the credit card interface to the transaction hub and conducting a credit card approval procedure. The presently preferred apparatus includes a system that includes a remote customer interface and a transaction hub. The remote customer interface preferably includes a credit card interface and a radio client. The transaction hub preferably includes a central server and a radio client. The system also preferably includes a radio server connected between the central server and the radio client.

DETAILED DESCRIPTION OF THE PREFERRED EMBODIMENTS

Figure 1:
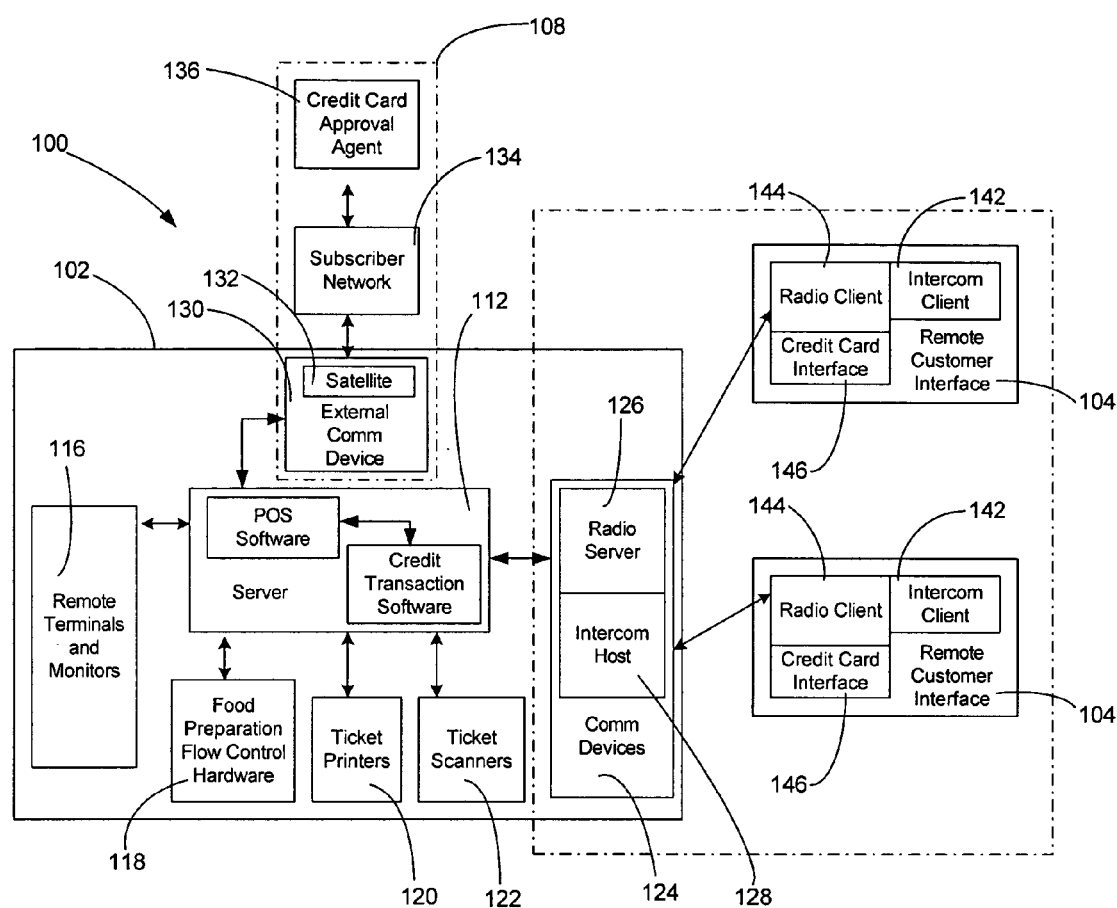
FIG. 1 is a functional diagram of a credit card transaction system constructed in accordance with a preferred embodiment of the present invention.

Beginning with FIG. 1, shown therein is a functional schematic of a credit card transaction system 100 constructed in accordance with a presently preferred embodiment. The credit card transaction system 100 is preferably used in connection with the operation of a business that includes a central transaction center with one or more linked remote interfaces. For the purposes of the present disclosure, the preferred embodiment has been explained with reference to an implementation in a quick-serve restaurant environment that includes a central building and one or more remote locations at which customers are provided service. It will be appreciated, however, that the credit card transaction system 100 may find utility in numerous alternative applications. For example, the credit card transaction system 100 can be used to conduct transactions in a business having one or more drive-through lanes for providing remote customer service.

It will also be understood that, as used herein and unless otherwise specified, the term "credit card" applies broadly to all types of monetary transactions using credit cards, debit cards, gift cards, loyalty cards, chip-based cards, key-fobs and the like. Furthermore, the term "customer's order" is used herein to denote all menu items, including drinks, desserts, packaged meals, gift cards and miscellaneous merchandise. Gift cards are variable-value, preloaded cards that can be purchased from the business and loaded with a desired amount of value by the issuer.

The transaction system 100 preferably includes a transaction hub 102, a remote customer interface 104, a local network 106 and an external network 108. As used herein, the term "network" will be understood to mean any series of interconnected electronic devices between which data or information is transmitted or received.

The transaction hub 102 is preferably housed inside the building of the quick-serve restaurant. The transaction hub 102 controls the process of receiving orders, preparing food, generating tickets and completing food purchase transactions and providing communication between the local network 106 and the external network 108. In the presently preferred embodiment, the transaction hub 102 includes a central server 112. The central server 112 is preferably a computer that includes some combination of hardware and software that has been configured to provide communication between the various components within the transaction hub 102. The central server 112 preferably also includes interconnected point of sale ("POS") and credit transaction software.

The transaction hub 102 also preferably includes a number of operational peripheral devices 114 connected directly or indirectly to the central server 112. These operational peripheral devices 114 include terminals 116, include food preparation and flow control hardware 118 (i.e., "bump bars"), ticket printers 120 and ticket scanners 122. The terminals 116 permit the entry of data, such as a customer's order, into the central server 112 or display information related to the status of a customer's order. In the preferred embodiment, at least one terminal 116 is dedicated to entering customer orders into the transaction hub 102. Several terminals 116 are preferably used to display customer order information at various stations (i.e., the kitchen, drink station and expedite station) within the building. The food preparation and flow control hardware 118, ticket printers 120 and ticket scanners 122 are used to optimize the preparation and delivery of the customer's order and receipt.

Information regarding a customer's order can be entered into the central server 112 at an order entering terminal 116, where an electronic order ticket representative of the customer's order is generated. The order ticket preferably includes information about the customer's location, the items requested by the customer, the status of the preparation of the customer's order and payment information associated with the customer's order. The order ticket is displayed or transferred to the operational peripheral devices 114 to indicate the real-time status of the customer's order and payment process. The order ticket includes a unique identification number that can be used to access information about the order ticket.

The information provided by the order ticket can be used to control the flow of operations in the quick-serve restaurant. For example, payment information received from the remote customer interface 104 can be used to control the preparation and delivery of the customer's food. Because the order ticket is preferably displayed at the operational peripheral devices 114, employees performing various roles at the quick-serve restaurant can coordinate their actions to provide enhanced customer service.

The transaction hub also preferably includes a number of local communication devices 124 connected directly or indirectly to the central server 112. In the preferred embodiment, the communication devices include a radio server 126, an intercom host 128 and an external communication device 130. The radio server 126 and intercom host 128 are both used to provide communication between the transaction hub 102 and the remote customer interface 104. In the presently preferred embodiment, the intercom host 128 is located on or near a terminal 116 that is configured to enter customer orders into the central server 112.

The external communication device 130 is used to provide communication between the transaction hub 102 and the external network 108. The external network 108 is preferably a credit card approval network that includes a credit card approval agent 136 (i.e., First Data Merchant Services, "FDMS"). The external network 108 is primarily responsible for processing credit card transactions. The external communication device 130 is preferably located inside the building and connected to the central server 112.

Figure 2:
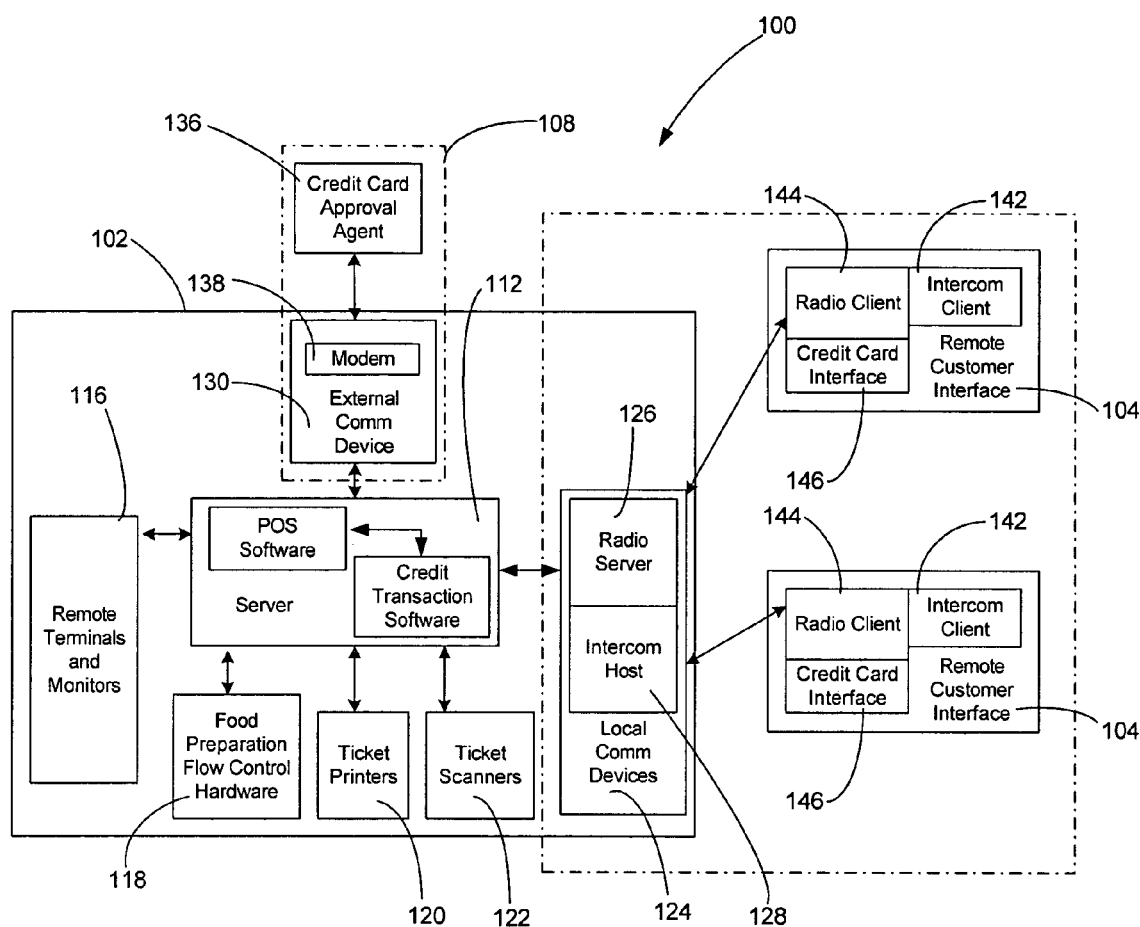
FIG. 2 is a functional diagram of a credit card transaction system constructed in accordance with an alternative preferred embodiment of the present invention.

In the presently preferred embodiment, the external communication device 130 is a satellite data connection 132. In the embodiment depicted in FIG. 2, the satellite data connection is linked to a subscriber network 134 that in turn connects to the credit card approval agent 136. In the alternate embodiment depicted in FIG. 2, the external communication device 130 is replaced by a modem 138 configured to transmit and receive digitized data over a telephony-based system. In a preferred embodiment, the external communication device 130 maintains a persistent connection to the credit card approval agent 136. Because many restaurants already use a satellite connection to a subscriber network 134, the use of the satellite data connection 132 for processing credit card transactions is faster and more cost effective than the persistent connection held by the modem.

It will be understood that the credit card transaction system 100 is configured to handle multiple credit card payments simultaneously. Multiple credit card payment requests are queued in the central server 112 for sequential processing by the credit card approval agent 136. Unlike prior art systems, sequential credit card requests are transmitted without waiting for individual host responses from the external network 108. In some applications, it is desirable to reduce processing time by employing multiple persistent connections through use of two or more external communication devices 130.

The remote customer interface 104 preferably includes an intercom client 142, a radio client 144 and a credit card interface 146. The intercom client 142 preferably includes a speaker and a microphone that allow the customer to communicate verbally with an employee operating the intercom host 128 inside the building. The intercom connection can be wired or wireless.

The radio client 144 communicates credit card information between the credit card interface 146 and the radio server 126 using radio communication. Significantly, unlike prior art transaction systems based on a serial configuration, the preferred embodiment of the credit card transaction system 100 makes use of "parallel" communication between the remote customer interfaces and the central server 102. Multiple remote customer interfaces 104 are capable of simultaneously communicating with the central server 102.

In a preferred embodiment, credit card and payment information are encoded before transmission between the radio client 144 and the radio server 126. In an alternate embodiment, the credit card interface 146 is hard-wired to the central server 112 with a suitable data cable.

The credit card interface 146 preferably includes a visual display, a card swipe and a keypad (not shown). The credit card interface 146 can be used to display payment information, the status of the customer's order, advertising or greeting messages. The card swipe is used to read or recognize the customer's credit or gift card. The keypad can be used to manually enter credit card information, to respond to options prompted by the transaction hub 102, or to access information in the transaction hub by order ticket or employee identification. It will be understood that the intercom client 142, radio client 144 and credit card interface 146 can be grouped as single or separate modules on the remote customer interface 104. It will also be understood that additional or alternative input/output devices, i.e., keypads and visual displays, can be added to the remote customer interface 104 for use in placing orders or conducting transactions.

The following paragraphs provide a simplified expression of the operation of a presently preferred embodiment of the credit card transaction system 100. It will be understood that the order of steps and configuration of devices may change based on application and improvements in technology.

A customer initiates a food purchase transaction by placing an order with the intercom client 142 with an employee located inside the restaurant. The employee enters the customer's order into the central server 112 through a terminal 116. An electronic order ticket is then generated within the central server 112 that corresponds to the customer's order. The order ticket is updated in real-time to reflect changes in the status of the customer's order. The order information is then communicated to the various operational peripheral devices 114 within the transaction hub 102 to optimize the flow of customer service.

Once the order is entered into central server 112, a message regarding the amount due for the order is preferably delivered to the remote customer interface 104. Preferably, the message is transmitted from the central server 112 to the credit card interface 126 through the radio server 126 and the radio client 142. In addition to the amount due, the message also provides the customer with the option of paying by cash, gift card or credit card. If the customer elects to pay in cash, the food purchase transaction is completed in a conventional process, in which an employee takes money from the customer before delivering the food.

If the customer elects to pay with a credit card, the credit card interface 146 displays a message asking the customer to swipe his or her credit card in the card swipe. Once the customer has swiped the credit card, the radio client 144 transfers the credit card information to the central server 112 via the radio server 126. In the presently preferred embodiment, the credit card information and payment information are matched with the appropriate order ticket in the central server 112 based on the location of the customer.

In the preferred embodiment, the option of paying with cash is automatically selected if no gift card or credit card information is transmitted from the remote customer interface 104 after a predetermined period of time. If the customer wishes to pay by credit card after the food has been delivered, the employee delivering the food can use the keypad on the credit card interface 146 to access the appropriate order ticket and make available the option of paying with a credit card or gift card.

Once the credit card information has been received, the transaction hub 102 performs a credit card approval procedure. Preferably, the central server 112 passes the credit card information and payment information to the credit card approval agent 136. The approval or denial of the credit card payment request is then transferred by the external communication device 130 to the central server 112.

The central server 112 then forwards the approval or denial information to the remote customer interface 104 from the transaction hub 102 through the local network 106. If approved, a credit card receipt is printed by the transaction hub 102 and delivered for signature to the customer (if required) with the customer's food.

The credit card transaction system 100 can also be used to separate a single customer order into several discrete orders, commonly referred to as "split tickets." Once a customer's has requested a split ticket, the order ticket is accessed in the central server 112 and divided into multiple orders according to the customer's request. Payment information regarding the multiple orders is then transmitted from the transaction hub 102 to the remote customer interface 104. The customer is given the option of paying for the entire transaction or for only a portion of the "split tickets."

For gift card transactions, the customer can use the gift card alone, or in combination with, the credit card process described above. When the customer swipes a gift card, gift card information is transferred from the remote customer interface 104 to the transaction hub 102. The gift card information may include balance information that is encoded directly onto the gift card. Alternatively, the gift card information can include an identification number unique to the gift card that can be used to retrieve balance information from a local database or from an external gift card approval network.

The initial balance information is then used to conduct the payment transaction. If the initial balance information is greater than the amount of the customer's order, the new balance will be associated with the gift card and a message is sent to the remote customer interface 104 informing the customer of the new balance. If the initial balance is less than the amount of the customer's order, the remote customer interface 104 will prompt the customer to supplement the payment by cash or credit.

The credit card transaction system can also be used to check the balance of the gift card or to add value to the gift card from the remote customer interface 104. When a customer swipes a gift card in the credit card interface 146, the gift card information is transmitted to the transaction hub 102. The credit card interface 146 then preferably presents the customer with several options, including checking the balance of the gift card and adding value to the gift card. Balance information can be accessed by swiping the card at the credit card interface 146 as described above. To add value, the customer first swipes the gift card to access the transaction hub 102. The customer can then add value to the gift card by swiping a credit card and selecting a load value at the remote customer interface 104. Alternatively, the customer can add value to the gift card by paying cash to an employee, who then loads the gift card from one of the terminals 116.

Thus, as set forth in the preferred embodiments described above, the credit card transaction system 100 provides the drive-in customer with the option to pay for food with a credit card. In accordance with one aspect of a preferred embodiment, the present invention provides a credit card transaction system 100 that includes a transaction hub 102, a remote customer interface 104, a local network 106 and an external network 108 for coordinating credit card transactions in a drive-in restaurant environment. It should be noted that the credit card transaction system 100 can also be used for merchandise other than food, including, but not limited to, clothing and novelty items.

A method of using the credit card transaction system 100 includes the steps of taking an order from the remote customer interface 104 using a first means of communication, entering the order into a central server 112 in the building, generating an order ticket in the central server 112 representative of the order, transmitting payment information associated with the order ticket to the at least one remote stall 103 using a second means of communication, transmitting credit card information from the remote stall 103 to the central server 112 using the second means of communication, and transmitting the credit card information and the payment information to a credit card approval network using a third means of communication. Although an intercom system, a radio communication system and a telephony-based communication system have been disclosed for the first, second and third means of communication, respectively, alternative means of communication could be used to conduct these communications.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein. It will be appreciated by those skilled in the art that the teachings of the present invention can be applied to other systems or environments without departing from the scope and spirit of the present invention.

It is claimed:

1. A method for conducting a credit card transaction at a business having a plurality of remote customer interfaces, the method comprising the steps of:
   electronically transmitting a customer's order from one of the plurality of remote customer interfaces to an order entry terminal via an intercom;
   entering the customer's order into a central server of a transaction hub;
   generating an electronic order ticket;
   transmitting payment information for the customer's order from the transaction hub to a credit card interface in the customer interface;
   electronically transmitting credit card information from the customer interface to the transaction hub, wherein the information is transmitted from a radio host in the customer interface to a radio server in the transaction hub with a radio signal after the customer has swiped a credit card;
   matching the credit card information and payment information with the order ticket based on the location of the customer;
   conducting a credit card approval procedure;
   delivering the order to the customer upon credit card approval;
   and wherein the transmission of the customer's order and the credit card information is not carried out on a common means of communication.

2. The method of claim 1, further comprising encoding the credit card information before transmitting the credit card information from the radio host to the radio server with a radio signal.

3. The method of claim 1, further comprising the step of confirming the customer's order on a visual display at the credit card interface.

4. The method of claim 1, further comprising the step of providing the customer with the option of paying with cash.

5. The method of claim 4, wherein the option of paying with cash is automatically selected if no credit card information is transmitted from the customer interface after a predetermined period of time.

6. The method of claim 1, wherein the order ticket includes a unique identification number, payment information and information about the location of the customer.

7. The method of claim 6, wherein the order ticket further reflects whether the customer has paid for the customer's order and the real-time status of the customer's order.

8. The method of claim 6, wherein the order ticket is displayed at operational peripherals to optimize the service provided to the customer.

9. The method of claim 1, wherein the step of conducting a credit card approval procedure further comprises transmitting credit card information and payment information from the transaction hub to an external credit card approval network.

10. The method of claim 9, further comprising the steps of receiving credit card approval information from the external credit card approval network and electronically transmitting the credit card approval information to the customer interface from the transaction hub.

11. The method of claim 1, wherein the credit card is a gift card and the step of conducting a credit card approval procedure further comprises the step of transmitting gift card and payment information from the transaction hub to an external gift card approval network.

12. The method of claim 1, further comprising the steps of:
   generating an order ticket representative of the customer's order in the central server;
   dividing the order ticket to reflect multiple orders; and
   transmitting payment information from the transaction hub to the customer interface for each of the multiple orders.

13. A method of conducting a credit card transaction at a quick-serve restaurant having a building and at least one remote customer interface located exterior to the building, the method comprising:
   taking an order from the at least one remote customer interface using an intercom;
   entering the order into a central server in the building;
   generating an electronic order ticket in the central server representative of the order;
   transmitting payment information associated with the order ticket to the at least one remote customer interface with a radio signal;
   transmitting credit card information from the remote customer interface to the central server with a radio signal;
   transmitting the credit card information and the payment information to a credit card approval network using a satellite data connection; delivering the order to the customer upon credit card approval;
   and wherein the taking of an order and the transmission of payment and credit card information is not carried out on a common means of communication.

* * * * *